(12) United States Patent
Eliuk (10) Patent No.: US 10,643,502 B2
(45) Date of Patent: May 5, 2020

(54) THERMAL-SENSITIVE APPEARANCE-CHANGING LABEL

(71) Applicant: Grant J. Eliuk, Calgary (CA)

(72) Inventor: Grant J. Eliuk, Calgary (CA)

( * ) Notice: Subject to any disclaimer, the term of this patent is extended or adjusted under 35 U.S.C. 154(b) by 0 days.

(21) Appl. No.: 16/476,240

(22) PCT Filed: Jan. 18, 2018

(86) PCT No.: PCT/CA2018/050054
§ 371 (c)(1),
(2) Date: Jul. 5, 2019

(87) PCT Pub. No.: WO2018/132910
PCT Pub. Date: Jul. 26, 2018

(65) Prior Publication Data
US 2019/0333419 A1    Oct. 31, 2019

Related U.S. Application Data

(60) Provisional application No. 62/448,243, filed on Jan. 19, 2017.

(51) Int. Cl.
*G01K 11/06*        (2006.01)
*G01K 11/16*        (2006.01)
(Continued)

(52) U.S. Cl.
CPC ............ *G09F 3/0294* (2013.01); *G01K 11/06* (2013.01); *G01K 11/165* (2013.01); *G09F 2003/0211* (2013.01)

(58) Field of Classification Search
CPC .................................................. G09F 3/0294
(Continued)

(56) References Cited

U.S. PATENT DOCUMENTS

| 4,638,107 A | 1/1987 | Davis |
| 5,058,856 A | 10/1991 | Gordon et al. |

(Continued)

FOREIGN PATENT DOCUMENTS

EP    0241247 A1    10/1987

OTHER PUBLICATIONS

Lcrhallcrest, "Digi-Temp Reversible Thermochromic Liquid Crystal Thermometers", PDS002 REV03, downloaded in Jan. 2017 from https://www.hallcresloom/DesktopModules/Bring2mind/DMX/Download.aspx?Command=Core_Download&EntryId=59&language=en-US&PortalId=0&,Tabld=163.

(Continued)

*Primary Examiner* — Justin V Lewis
(74) *Attorney, Agent, or Firm* — ATMAC Patent Services Ltd.; Andrew T. MacMillian (57) ABSTRACT

A thermal-sensitive label includes a label-specific set point temperature visually displayed thereon, and a thermal indicator that changes visual appearance in dependence upon temperature change in comparison with a threshold temperature. The threshold temperature of the thermal indicator is set during manufacture to be a fixed amount above the set point temperature. The thermal indicator has a first visual appearance when a temperature measured by the thermal indicator is below the threshold temperature. The thermal indicator dynamically changes to a second visual appearance different than the visual appearance when a second temperature measured by the thermal indicator exceeds the threshold temperature. A label kit includes multiple labels with a variety of different set-points. Each of the labels may include one or both of a reversing thermal indicator for comparing current temperature to the threshold temperature and a non-reversing thermal indicator for comparing a maximum temperature to the threshold temperature.

20 Claims, 7 Drawing Sheets

(51) Int. Cl.
*G09F 3/02* (2006.01)
*G09F 3/00* (2006.01)

(58) Field of Classification Search
USPC .................. 283/72, 74, 81, 94, 98, 114, 901
See application file for complete search history.

(56) References Cited

U.S. PATENT DOCUMENTS

| | | | |
|---|---|---|---|
| 5,450,065 | A | 9/1995 | Greenfield |
| 6,422,171 | B1 | 7/2002 | Betts |
| 6,564,742 | B2 | 5/2003 | Perner et al. |
| 6,911,891 | B2 | 6/2005 | Qiu et al. |
| 7,358,740 | B2 | 4/2008 | Davis et al. |
| 7,450,797 | B2 | 11/2008 | German et al. |
| 7,508,294 | B2 | 3/2009 | Cabal et al. |
| 8,066,432 | B2 | 11/2011 | Yang et al. |
| 8,096,708 | B2 | 1/2012 | Harrington |
| 8,269,597 | B2 | 9/2012 | Darr et al. |
| 9,058,729 | B2 | 6/2015 | Johnson et al. |
| 9,097,593 | B2 | 8/2015 | Johnson et al. |
| 9,224,565 | B2 | 12/2015 | Moon |
| 9,316,550 | B2 | 4/2016 | Frangi et al. |
| 9,316,594 | B2 | 4/2016 | Kane |
| 9,395,110 | B2 | 7/2016 | Savelli et al. |
| 2004/0160302 | A1 | 8/2004 | Yasuoka et al. |
| 2008/0129441 | A1 | 6/2008 | Darr et al. |
| 2009/0108983 | A1* | 4/2009 | Darr .............. H01H 85/30 337/243 |
| 2015/0248044 | A1 | 9/2015 | Kimura |
| 2016/0245707 | A1 | 8/2016 | Cipriano et al. |

OTHER PUBLICATIONS

Lcrhallcrest, "Thermax Irreversible Temperature Recording Strip", PDS001 Rev8, downloaded in Jan. 2017 from https://www.hallcrest.com/.

International Search Report from the Patent Cooperation Treaty (PCT) dated May 2, 2018 in counterpart application PCT/CA2018/050054.

Written Opinion of the International Searching Authority dated May 2, 2018 in counterpart application PCT/CA2018/050054.

CIPO Examination Notes dated May 2, 2018 in counterpart application PCT/CA2018/050054.

Lingle, Rick; "Coors' label shows beer temperature", dated Jun. 11, 2007; downloaded from http://www.packworld.com/coors-label-shows-beer-temperature-0 on Jan. 17, 2017.

* cited by examiner

THERMAL-SENSITIVE APPEARANCE-CHANGING LABEL

CROSS-REFERENCE TO RELATED APPLICATIONS

This application claims the benefit of priority of U.S. Provisional Application No. 62/448,243 filed Jan. 19, 2017, which is incorporated herein by reference.

BACKGROUND OF THE INVENTION

(1) Field of the Invention

The invention pertains generally to detecting problems that cause a thermal rise in electrical equipment. More specifically, the invention relates to thermal-sensitive appearance-changing labels that detect and visually indicate thermal temperature changes of electrical equipment.

(2) Description of the Related Art

Loose electrical connections, overloaded breakers, and other electrical problems often result in overheating of electrical components. Overheated electrical components are undesirable for a number of reasons including the risk of fire and burns, reduced reliability of affected processors and systems, increased energy waste, and the potential for loss of property and life.

Temperature rise of an otherwise functioning electrical component is a known sign of impending failure of that component. It is highly desirable to detect unexpected temperature rise prior to catastrophic failure. Infrared thermography, also known as thermal imaging, can be utilized to locate overheating, breakers, joints and other components of electrical systems in order to identify suspected problem areas. Corrective action can then be taken before the overheated components completely fail.

During a thermographic site survey, a trained thermographer physically walks around a building property taking a series of thermograms (thermal images) of the electrical equipment, and then compiles a report showing results and recommendations. Different types of reports and levels of detail may be provided depending on the type of survey commissioned. For instance, the report may compare measured temperature values of all electrical equipment with known baseline temperature values in order to identify abnormalities.

Although thermography is highly effective to detect temperature abnormalities in electrical systems, the thermographic imaging process is not continuous monitoring. Instead, a building or other site typically commissions a thermographic site survey on a sporadic or periodic basis such as once a year, or at best every six months. If an electrical problem occurs after the thermographic site survey is performed, it will not be detected until a subsequent site survey is conducted some time in the future. As thermographic site surveys tend to be costly, thermographic inspection may be deferred or even forgone because of budgetary concerns. Unfortunately, some owners and operators may never have their building's electrical systems thermally imaged.

Although many electrical problems and their associated risks could be prevented in advance by detecting temperature rises of electrical equipment, equipment temperature rises are often not detected in time by building owners. It would be highly beneficial to provide better visibility and detection of equipment temperature rises as a warning sign to avoid catastrophic failure of electrical systems (or worse).

BRIEF SUMMARY OF THE INVENTION

According to an exemplary embodiment of the invention there is disclosed a self adhesive electrical safety and indicator label. The label detects and provides a visual reference of thermal anomalies for the application of electrical systems and their components that otherwise may be invisible. This is accomplished in some embodiments using a liquid crystal that is controlled with specific temperature thresholds to produce specific color changes when measured temperature of the label deviates by one or more fixed amounts from a label-specific set point. The labels beneficially show that a thermal anomaly is present and the severity of that anomaly.

According to an exemplary embodiment of the invention there is disclosed a thermal-sensitive label includes a label-specific set point temperature visually displayed thereon, and a thermal indicator that changes visual appearance in dependence upon temperature change in comparison with a threshold temperature. The threshold temperature of the thermal indicator is set during manufacture to be a fixed amount above the set point temperature. The thermal indicator has a first visual appearance when a temperature measured by the thermal indicator is below the threshold temperature. The thermal indicator dynamically changes to a second visual appearance different than the visual appearance when a second temperature measured by the thermal indicator exceeds the threshold temperature.

According to another exemplary embodiment of the invention there is disclosed a label kit having a plurality of labels. Each of the labels has a label-specific set point temperature visually displayed thereon. Each of the labels includes a thermal indicator that changes visual appearance in dependence upon temperature change in comparison with a first threshold temperature. The first threshold temperature of the thermal indicator within each particular one of the labels is set during manufacture to be a fixed amount above the label-specific set point temperature for the particular one of the labels. The thermal indicator has a first visual appearance when a first temperature measured by the thermal indicator is below the first threshold temperature. The thermal indicator dynamically changes to a second visual appearance different than the first visual appearance when a second temperature measured by the thermal indicator exceeds the first threshold temperature.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
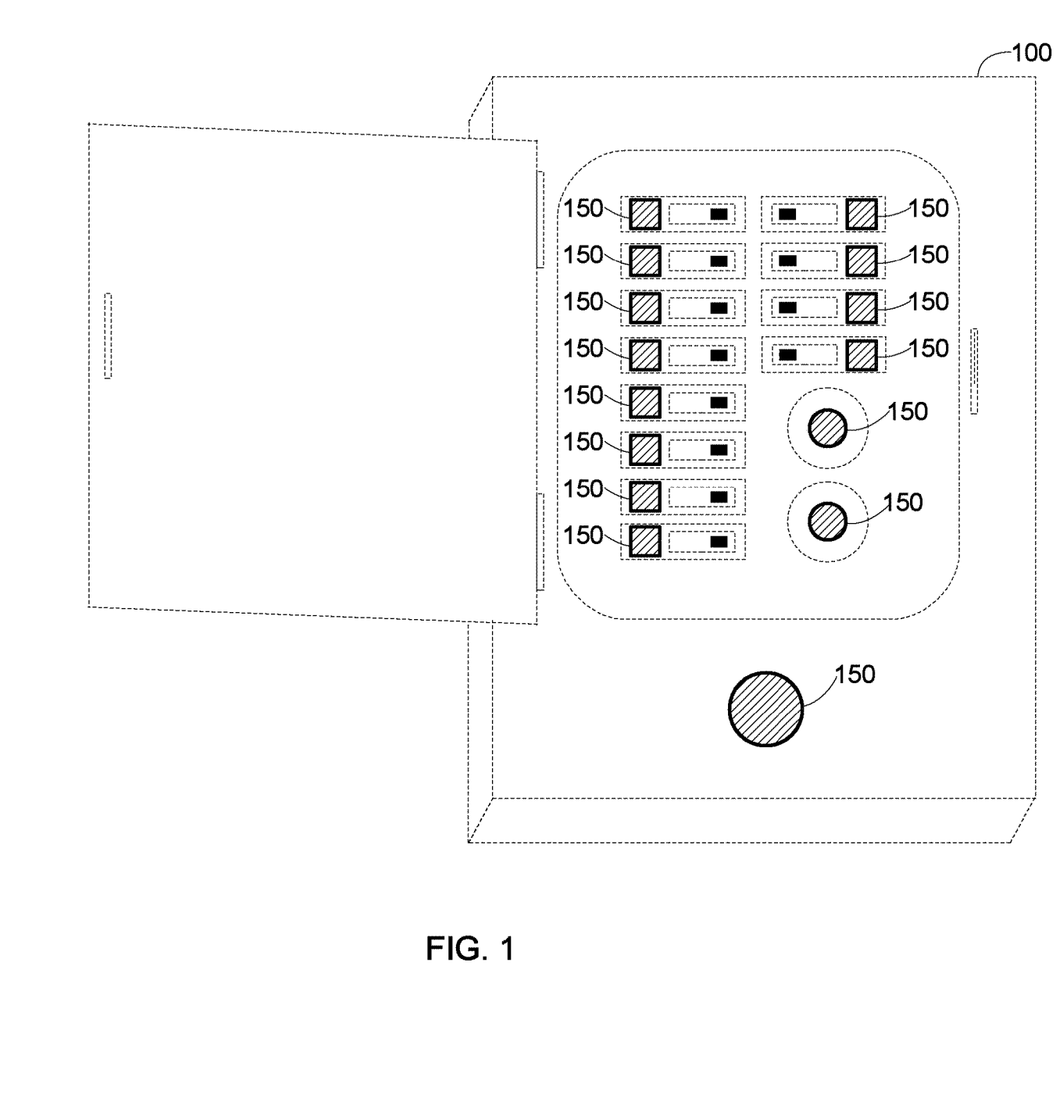
FIG. 1 illustrates an electrical circuit breaker box having a plurality of thermal-sensitive labels detecting and indicating temperature rises of the breaker box itself and components therein according to an exemplary embodiment of the invention.

FIG. 1 illustrates an electrical circuit breaker box 100 having a plurality of thermal-sensitive labels 150 detecting and indicating temperature rises of the breaker box 100 itself and components therein according to an exemplary embodiment of the invention. The breaker box 100 of FIG. 1 is intended as an example of an enclosure that may have a temperature rise as a result of the ambient air temperature within the box being heated up due to an electrical problem within the box 100. Likewise, the various breaker switches and fuses illustrated in FIG. 1 are intended as examples of electrical components that may have temperature rises as a result of the component itself experiencing an electrical problem or otherwise being in the process of failing.

The thermal-sensitive labels 150 are affixed to various target devices under test such as enclosures and components. Each of the labels 150 includes one or more thermal indicator(s) for displaying different colors depending on temperature rises detected by the label 150 above a label-specific set point temperature. For example, when the current temperature of a particular label 150 is below a baseline threshold temperature predetermined for that label 150 according to the set point, a reversing thermal indicator on the label 150 appears black in color. When the current temperature of that particular label 150 later goes above the baseline threshold temperature, the reversing thermal indicator dynamically changes its color to red. Later, if the temperature cools down again below the baseline threshold temperature, the reversing thermal indicator changes back to black. Non-reversing thermal indicator(s) may also be included on the labels 150 to record maximum temperatures experienced by a particular label 150. For instance, once the temperature exceeds the baseline threshold temperature, the non-reversing thermal indicator permanently changes it color to red. At any time, a user can determine whether the target device under test is running hot (and/or has been running hot) by simple visual inspection of the label 150 affixed thereto.

Figure 2:
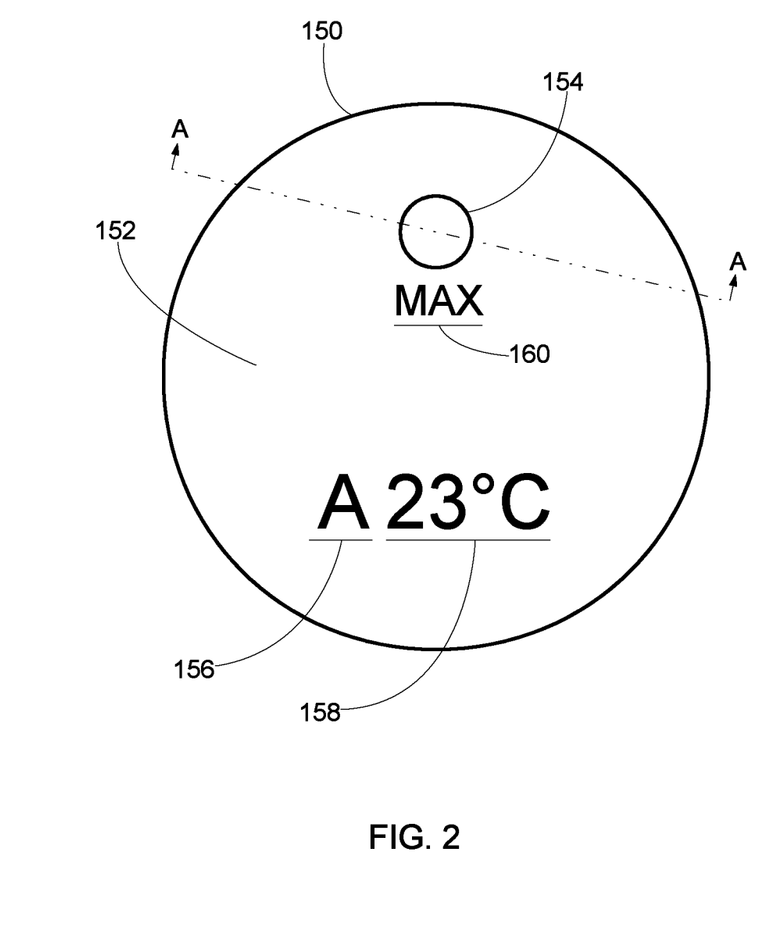
FIG. 2 shows a top view of a thermal-sensitive label according to an exemplary embodiment of the invention.

FIG. 2 shows a top view of a thermal-sensitive label 150 according to an exemplary embodiment of the invention. The label 150 includes a thermochromic liquid crystal layer that acts as a reversing thermal indicator 152 for indicating current temperature. As shown in FIG. 2, when viewed from the top by a user, most of the top surface of the label 150 shows the reversing thermal indicator 152. The color of the reversing thermal indicator 152 indicates whether the current temperature of the target device to which the label 152 is affixed has deviated by one or more fixed amounts from the set point 158 of the label 150.

The label 150 also includes a smaller non-reversing thermal indicator 154. The non-reversing thermal indicator 154 comprises one or more irreversible phase-change indicators that melt at a defined melting point and are absorbed by a substrate thereby causing permanent color change. The color of the non-reversing thermal indicator 154 indicates whether the maximum temperature of the target device to which the label 152 is affixed has ever deviated by one or more fixed amounts from the set point 158 of the label 150.

The label 150 also includes some text lettering to help the user understand the characteristics of the label 150. A type designation 156 is provided to let the user know the type of the label. In the example shown in FIG. 2, the type designation 156 of "A" indicates that the label 150 is an "ambient" type. In some embodiments, the lack of a specific type designation 156 indicates that the label 150 is a "direct contact" type. Other types of labels 150 may include different country or electrical code specific versions and other type designations 156 may be utilized to indicate these other types. As will be explained further in the following, labels of different types will have different fixed amounts and corresponding thresholds to cause color changes given a same set point temperature 158 indicated on the label 150.

The label 150 includes an indication of its predetermined set point temperature 158. In the illustrated example, the set point is 23 degrees Celsius. The set point 158 is a predetermined characteristic of the label 150 and is utilized during manufacture in combination with one or more fixed amounts according to the type of the label 150 to set one or more thresholds upon which the color of the reversing and non-reversing thermal indicator(s) 152, 154 of the label 150 will change color.

Finally, the label 150 includes the text "MAX" 160 utilized to remind the user of the purpose of the non-reversing thermal indicator 154 is to record the "maximum" temperature deviation experienced by the label 150.

Figure 3:
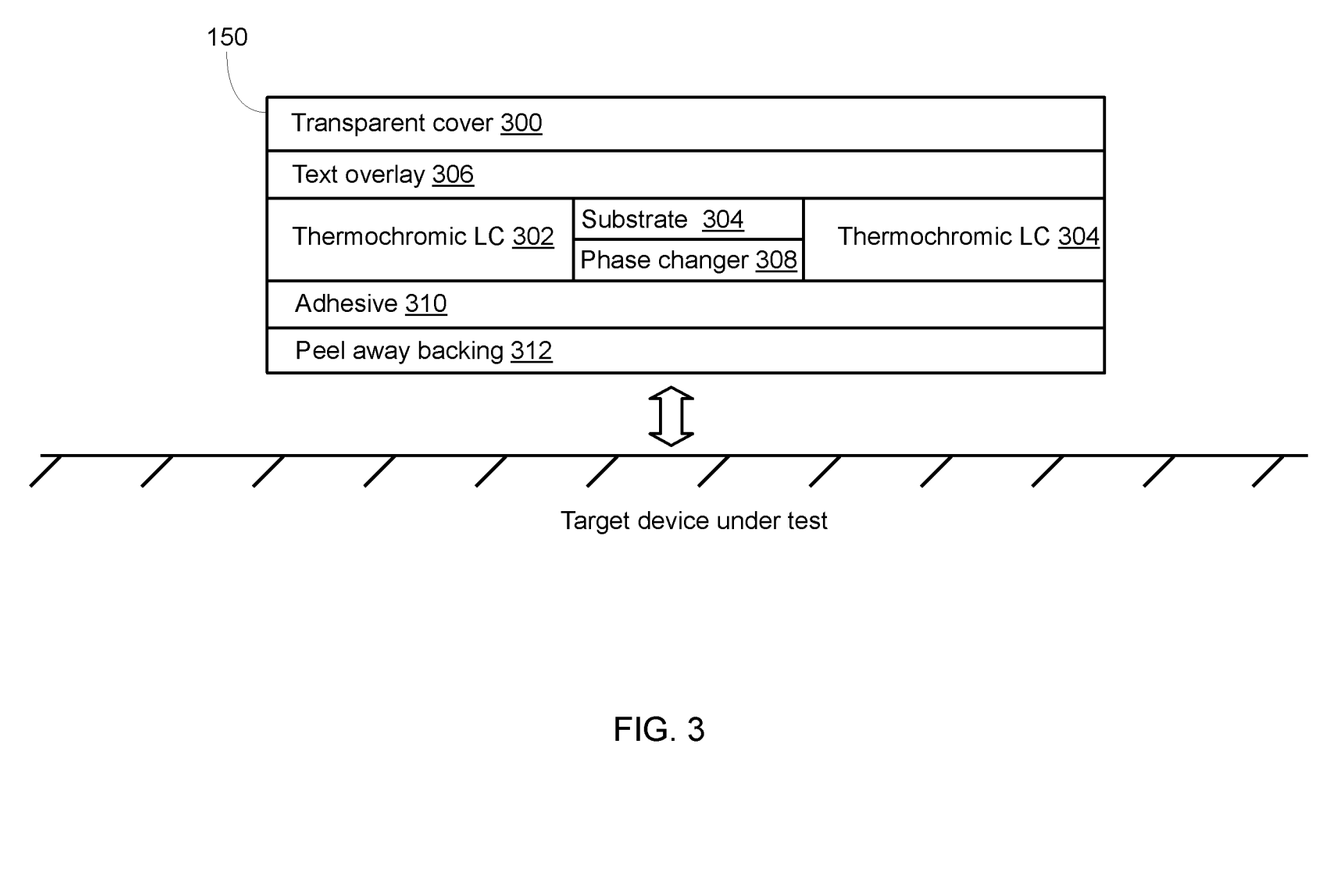
FIG. 3 illustrates a cross section of the layers of the label as seen along the section line A-A shown in FIG. 2 according to an exemplary embodiment.

FIG. 3 illustrates a cross section of the layers of the label 150 of FIG. 2 as seen along the section line A-A shown in FIG. 2 according to an exemplary embodiment. In this configuration, the label 150 includes a transparent cover 300 providing protection to the label 150 while allowing a user to see the thermochromic liquid crystal (LC) layers 304 and the substrate layers 306 through the transparent cover 300. A text overlay layer 306 provides the textual lettering of the label 150; although it is shown as separate to the transparent cover 300 in FIG. 3, in other embodiments the text overlay 306 is combined with the transparent cover 300.

Below the text overlay 306 are the thermochromic liquid crystal layers 302 forming the reversing thermal indicator 152, and the substrate 304 forming one part of the non-reversing thermal indicator 154. One or more phase changer (s) 308 are positioned adjacent the substrate 304 such that, when a phase changer 308 melts, the phase changer 308 will be absorbed by the substrate 304 and the color change of the substrate 304 will change and be visible to the user from the top through the transparent cover 300. An adhesive layer 310 is provided to enable the user to affix the label 150 to a target device under test. Finally, a peel away backing 312 may be installed during manufacture and removed by the user just prior to affixing the label 150 to the target device.

Figure 4:
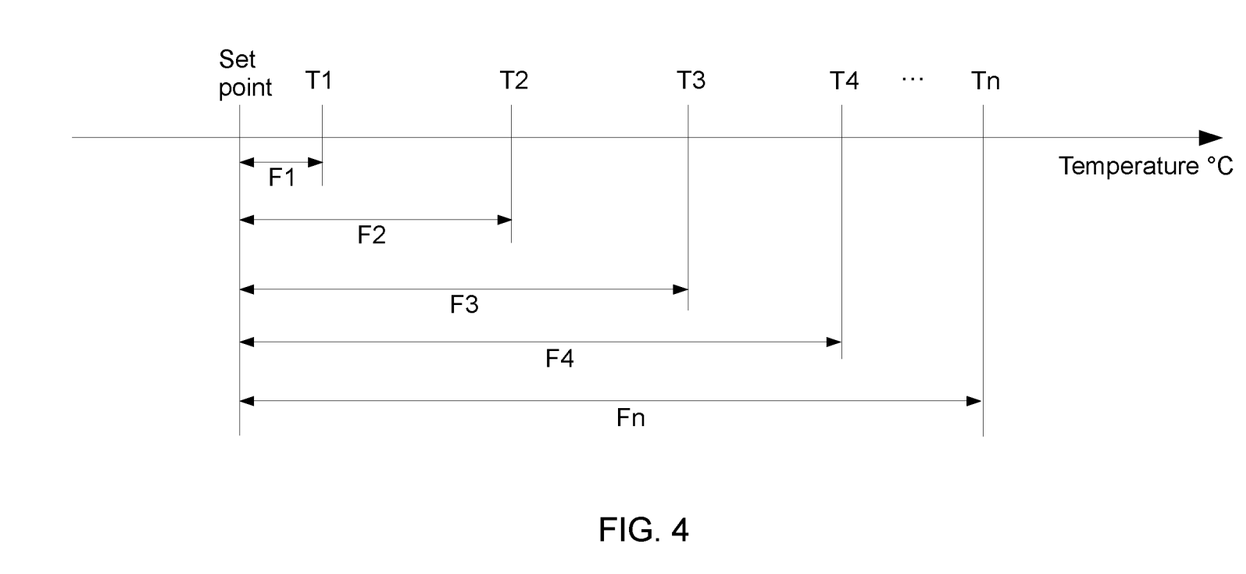
FIG. 4 illustrates how the one or more threshold temperatures T1-Tn for a specific label are related to the set point temperature for that label by one or more fixed values F1-Fn according to an exemplary embodiment.

FIG. 4 illustrates how the one or more threshold temperatures T1-Tn for a specific label 150 are related to the set point temperature for that label 150 by one or more fixed values F1-Fn according to an exemplary embodiment.

Given a particular set point temperature for a given label 150, there are one or more predetermined temperature thresholds T1-Tn. Each of these thresholds is a respective fixed amount F1-Fn above the set point temperature. The fixed amounts F1-Fn are specific amounts set according to the type of the label 150. For instance, different government regions and electrical codes have different safety requirements related to relative temperature rises of electrical components. In order to accommodate these requirements, labels 150 of a particular country or code type have the same fixed amounts F1-Fn for all set point temperatures. The F1-Fn values are fixed for a particular type of label 150 regardless of differences in set point values. Labels 150 of different types such as for other countries or codes may utilize different fixed amounts F1-Fn according to their specific safety requirements. Likewise, depending on whether the label 150 is measuring temperature rises on a target device heated by ambient air or by direct contact with the electrical component may affect the selection of the F1-Fn values. In other words, there may be an "ambient" type of label 150 and a "direct contact" type of label 150 with the same set point temperature 158 but with different F1-Fn values and therefore different threshold temperatures T1-Tn where color changes of the thermal indicator(s) 152, 154 occur.

Some examples of specific fixed amounts F1-Fn for different real-world situations are provided in the below tables.

TABLE 1

In view of the "Severity Criteria" under both National Fire Protection Association (NFPA) and InterNational Electrical Testing Association (NETA):

| | Fixed amount | Reasoning |
|---|---|---|
| F1 | 1° C. | Temperature differences of 1 Deg C. to 3 Deg C. indicate possible deficiency and warrant investigation. |
| F2 | 4° C. | Temperature differences of 4 Deg C. to 15 Deg C. indicates deficiency repairs should be made as time permits. |
| F3 | 16° C. | Temperature differences of 16 Deg C. and above indicate major deficiency; repairs should be made immediately. |

There are only three fixed values F1-F3 required in this example and therefore only three thresholds T1-T3 will be calculated and implemented on these labels 150.

TABLE 2

In view of the NETA International testing Association Maintenance testing Specifications 1997 related to direct contact type measurements:

| | Fixed amount | Reasoning |
|---|---|---|
| F1 | 1° C. | 1 Deg C.-3 Deg C. Temperature difference (Delta T) based on comparison between similar components under similar loading has recommended action "Possible Deficiency Warrants Investigation" |
| F2 | 4° C. | 4 Deg C.-15 Deg C. Temperature difference (Delta T) based on comparison between similar components under similar loading has recommended action "Indicates Probable Deficiency Repair as Time Permits" |
| F3 | 16° C. | Greater than 16 Deg C. Temperature difference (Delta T) based on comparison between similar components under similar loading has recommended action "Major Discrepancy; Repair Immediately" |

Again, there are only three fixed values F1-F3 required in this example and therefore only three thresholds T1-T3 will be calculated. As the F1-F3 values of Table 2 match those of Table 1, thermal-sensitive labels 150 manufactured according to these F1-F3 values may be labeled as a same type 156 compatible with both codes. In an exemplary embodiment, the type designation 156 may be left blank on labels 150 manufactured according to the F1-F3 values of Tables 1 and 2.

TABLE 3

In view of the NETA International testing Association Maintenance testing Specifications 1997 related to ambient type measurements:

| | Fixed amount | Reasoning |
|---|---|---|
| F1 | 0° C. | 0 Deg C.-10 Deg C. Temperature difference (Delta T) based upon comparisons between component and ambient air temperature has recommended action "Possible Deficiency Warrants Investigation" |
| F2 | 11° C. | 11 Deg C.-20 Deg C. Temperature difference (Delta T) based upon comparisons between component and ambient air temperature has recommended action "Indicates Probable Deficiency Repair as Time Permits" |
| F3 | 22° C. | 22 Deg C.-40 Deg C. Temperature difference (Delta T) based upon comparisons between component and ambient air temperature has recommended action "Monitor Continuously until Corrective Measures can be Accomplished" |
| F4 | 40° C. | Greater than 40 Deg C. Temperature difference (Delta T) based upon comparisons between component and ambient air temperature has recommended action "Major Discrepancy; Repair Immediately" |

In this table there are four fixed values F1-F4 and therefore a corresponding four thresholds T1-T4 will be calculated. Also, the actual F1-F4 values are different than the above examples. For this reason, thermal-sensitive labels 150 manufactured according to the F1-F4 values of Table 3 will change colors at different threshold temperatures T1-T4 than those manufactured in compliance with the F1-F3 values of Tables 1 and 2. In an exemplary embodiment, the type designation 156 for labels manufactured according to the F1-F4 values of Table 3 may be the letter "A" which stands for "ambient" as shown in FIG. 2.

TABLE 4

In view of the international society for optics and photonics SPIE, Denmark XVI; Vol.2245; P 11 1994 Low voltage (Denmark's low voltage guidelines):

| Fixed amount | | Reasoning |
|---|---|---|
| F1 | 1° C. | Less than % Deg C. must be kept under observation |
| F2 | 5° C. | 5-30 Deg C. must be repaired as soon as possible |
| F3 | 30° C. | Greater than 30 Deg C. must be repaired immediately |

Again, there are only three fixed values F1-F3 required in this example and therefore only three thresholds T1-T3 will be calculated and implemented on labels 150 of this type. Thermal-sensitive labels 150 manufactured according to the F1-F3 values of Table 4 will change colors at different threshold temperatures than those manufactured in compliance with Tables 1-3. In an exemplary embodiment, the type designation 156 for labels manufactured according to the F1-F3 values of Table 4 may be the letters "DLV" which stands for "Denmark Low Voltage".

Of course, the above tables are only four examples to help with an understanding of certain embodiments; in practice, any number of types of different labels 150 having any number of application specific fixed amounts F and corresponding thresholds T representing appearance changes of the thermal indicator(s) 152, 154 may be built in a similar manner.

Figure 5:
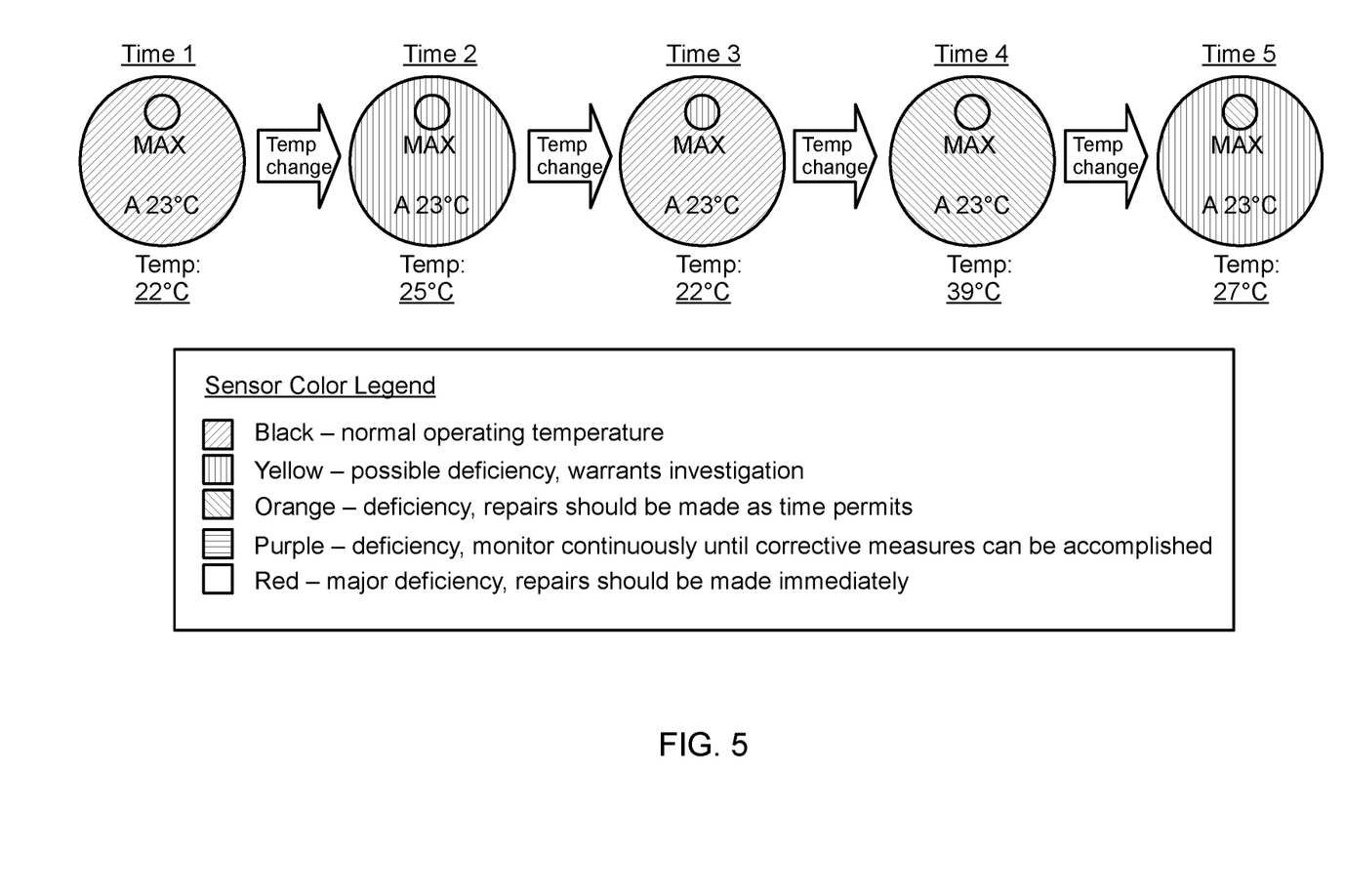
FIG. 5 shows different visual appearances of a label at different time points as temperature changes occur according to an exemplary embodiment.

FIG. 5 shows different visual appearances of a label 150 at different time points as temperature changes occur according to an exemplary embodiment. In this example, the type designation 156 of the label 150 is "A" and it is therefore assumed to have been manufactured according to the F1-F4 values set forth above in Table 3. This particular label 150 has a set point temperature 158 of 23° C. and thus has four label-specific thresholds are calculated and implemented during manufacture as follows:

TABLE 5

Temperature threshold values for label in FIG. 5

| Thresholds | | Method of calculation |
|---|---|---|
| T1 | 23° C. | 23° C. set point + 0° C. F1 fixed amount |
| T2 | 34° C. | 23° C. set point + 11° C. F2 fixed amount |
| T3 | 45° C. | 23° C. set point + 22° C. F3 fixed amount |
| T4 | 63° C. | 23° C. set point + 40° C. F4 fixed amount |

At a first time point, the current temperature of the label 150 is 22° C. Because the current temperature (22° C.) is less than the first threshold T1 (23° C.), both the reversing and non-reversing thermal indicators 152, 154 are black indicating that the target device is and has been operating within its normal operating temperature range.

At a second time point, the current temperature of the label 150 has increased to 25° C. Because the current temperature (25° C.) is now greater than the first threshold T1 (23° C.), both the reversing and non-reversing thermal indicators 152, 154 are yellow indicating the target device has a possible deficiency and warrants investigation.

At a third time point, the current temperature of the label 150 has decreased back down to 22° C. Because the current temperature (22° C.) is less than the first threshold T1 (23° C.), the reversing thermal indicator 152 has changed back to black indicating that the target device is currently operating within its normal operating temperature range. However, the non-reversing thermal indicator 154 stays at the yellow color thereby indicating that the target device has at some point in the past had a possible deficiency warranting investigation.

At a fourth time point, the current temperature of the label 150 has increased to 39° C. Because the current temperature (39° C.) is now greater than the third threshold T2 (34° C.), both the reversing and non-reversing thermal indicators 152, 154 are orange indicating the target device has a deficiency and that repairs should be made as time permits.

At a fifth time point, the current temperature of the label 150 has decreased down to 27° C. Because the current temperature (27° C.) is between the first and second thresholds T1, T2 (23° C., 34° C.), the reversing thermal indicator 152 has changed back to yellow indicating that the target device has a possible deficiency and warrants investigation. However, the non-reversing thermal indicator 154 stays at the orange color thereby indicating that the target device has at some point in the past had a temperature indicating a deficiency warranting repairs to be made as time permits.

Figure 6:
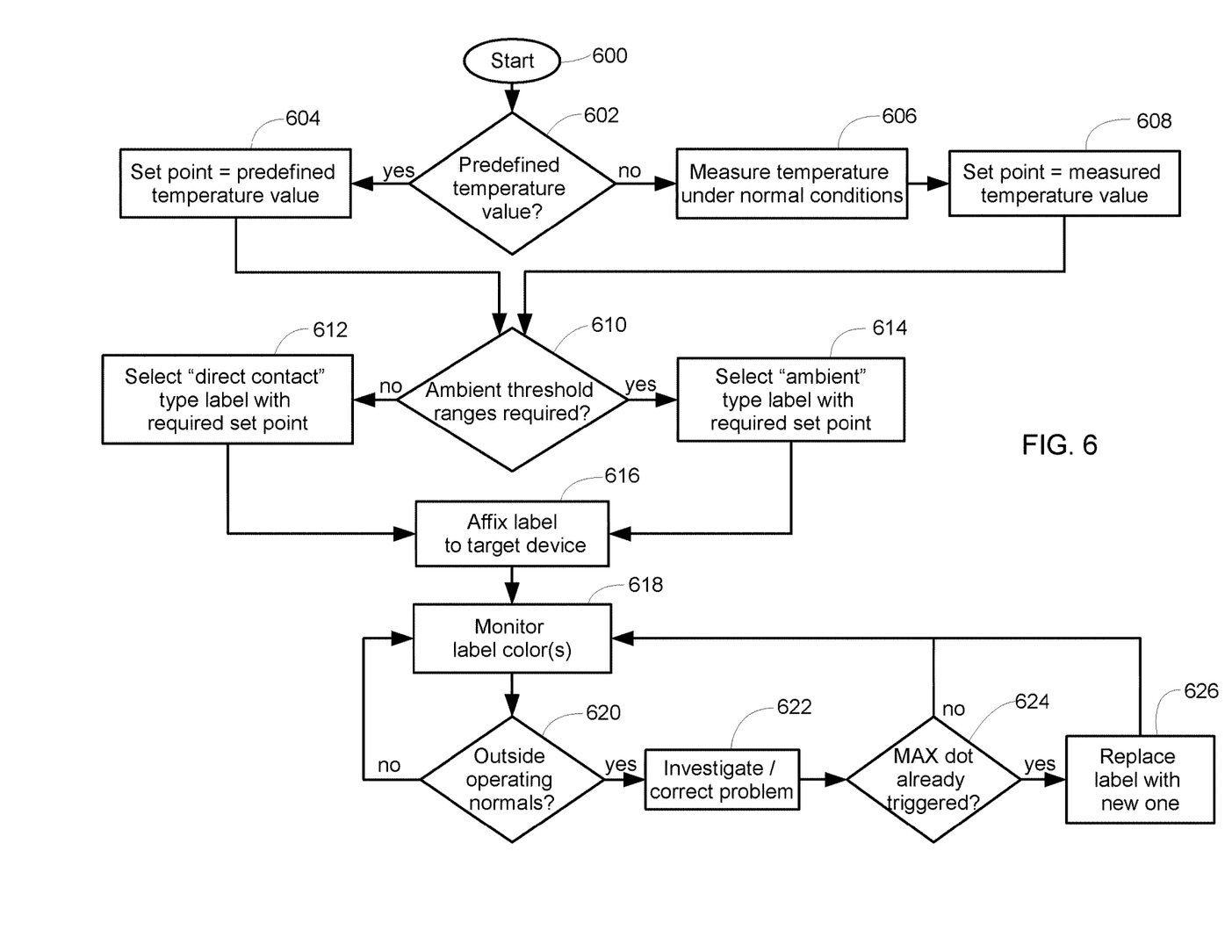
FIG. 6 shows a flowchart describing a method of utilizing a thermal-sensor label according to an exemplary embodiment.

FIG. 6 shows a flowchart describing a method of utilizing a thermal-sensor label 150 according to an exemplary embodiment. The steps of the flowchart are not restricted to the exact order shown, and, in other configurations, shown steps may be omitted or other intermediate steps added.

The process begins at step 600 such as when a building technician, thermographer, or other user does a site survey and determines a target device that should be monitored to detect thermal rises as warning signs of a potential electrical problem. At step 602, the user determines whether there is a known predetermined baseline temperature value for the target device. For instance, the user manual or a previous thermographic report may specify the baseline temperature of the component under normal operating conditions. If this value is known, the set point is determined at step 604 to be the predefined temperature. Alternatively, if there is no predefined temperature, the temperature of the target device is measured at step 606 while the device is known to be operating at its nominal conditions. At step 608, the set point is set to be the measured temperature. For instance, if the target device is operating at 23° C. under normal conditions, the set point for that target device is determined to be 23° C.

At step 610, the user selects an appropriate thermal-sensitive label 150. In this example, the selection of the type involves determining whether the label 150 will be measuring temperature rise of the target device due the ambient air around the electrical fault or will be measuring direct contact temperature rise from the label being affixed directly to the component that is generating the heat without an intermediate air gap. For example, if the target device is an enclosure such as box 100 of FIG. 1, the user will select an ambient "A" type of label 150 at step 614. Alternately, if the target device is a fuse or breaker, the user will select a direct contact type of label 150 at step 612. In either case, the selected label 150 will have a set point matching the desired set point determined at steps 602-608. For instance, a label kit may have a plurality of labels of a different types and with different set points. In this way, the user can select an appropriate label that is of the desired type and set point for a particular target device.

At step 616, the user affixes the selected label 150 to the target device and then periodically monitors the color(s) of the thermal indicator(s) on the label 150 at step 618. If no color changes are apparent during inspection, for example, if the label is still black indicating operating in normal conditions, the user can just continue to monitor the label over time. On the other hand, if the user finds upon visual inspection that the label 150 has changed color, either one or both of the reversing and non-reversing thermal indicators 152, 154, at step 622 the user investigates/corrects the problem.

At step 624, the user checks whether the non-reversing thermal indicator requires resetting back to its baseline (normal) state. If yes, at step 626, the user removes the old label and replaces it with a new one. The new label should be of the same type and have the same set point as the old label 150 unless there is a change in circumstance such as the previous label being of the wrong type or the user determining that a different set point temperature would be more appropriate.

Of course, the process of FIG. 5 may be repeated for all target devices desired to be tested and monitored in a building or other site over time. A trained initial installer may affix all the labels 150 and then the monitoring step 618 may be done by any untrained person in the building such as during routing visual inspections. In this way, thermal rise warning signs of electrical component failure and other problems may be easily recognized by users in the building without the expense of frequent thermographic inspections.

Figure 7:
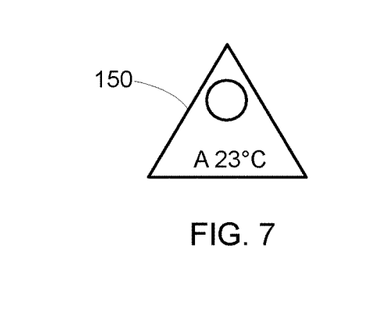
FIG. 7 shows a triangular shaped thermal-sensitive label according to an exemplary embodiment.
Figure 8:
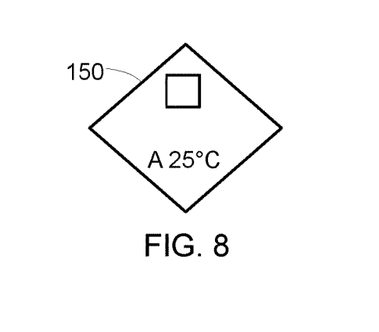
FIG. 8 shows a diamond shaped thermal-sensitive label according to an exemplary embodiment.
Figure 9:
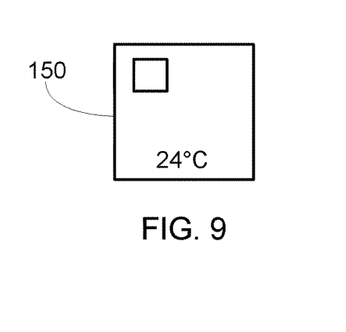
FIG. 9 shows a square shaped thermal-sensitive label according to an exemplary embodiment.

FIGS. 7-14 show some more examples of different shapes and sizes of thermal-sensitive labels according to various embodiments of the present invention. A label kit may include a plurality of different labels with different set points, types, shapes, and sizes thereby allowing a user conducting the initial installation of the labels to easily select an appropriate label for each target component. Briefly, FIG. 7 shows a triangular shaped label 150, FIG. 8 shows a diamond shaped label 150, and FIG. 9 shows a square shaped label 150. Other shapes and sizes of labels 150 may be provided in a label kit to fit any number of possible target devices according to some exemplary embodiments.

Figure 10:
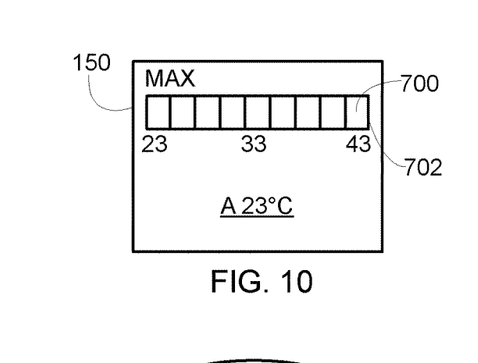
FIG. 10 shows a landscape orientated thermal-sensitive label where the non-reversing thermal indicator indicates the maximum temperature of the target device according to an exemplary embodiment.
Figure 11:
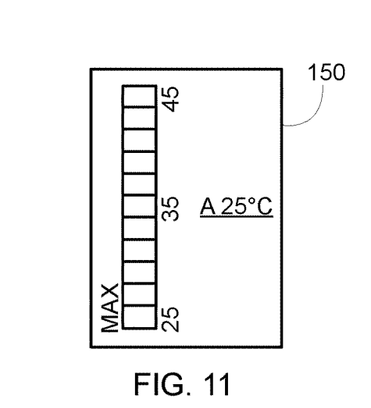
FIG. 11 shows a portrait orientated thermal-sensitive label where the non-reversing thermal indicator indicates the maximum temperature of the target device according to an exemplary embodiment.
Figure 12:
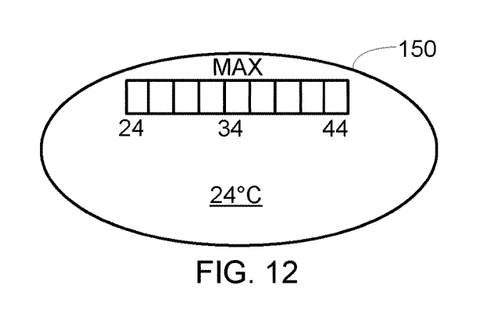
FIG. 12 shows an oval-shaped thermal-sensitive label where the non-reversing thermal indicator indicates the maximum temperature of the target device according to an exemplary embodiment.

FIGS. 10-12 shows another embodiment of label 150 where the non-reversing thermal indicator actually indicates the maximum temperature of the target device rather than the same color changes representing exceeding a particular threshold T1-Tn used by the reversing thermal indicator. For instance, in FIG. 10 each of the units 700 in the range bar 702 may indicate the temperature has increased by 1° C. (or any other predetermined fixed amount). This may be implemented by having separate phase changers 308 under a substrate 304 for each unit in the range bar.

Figure 13:
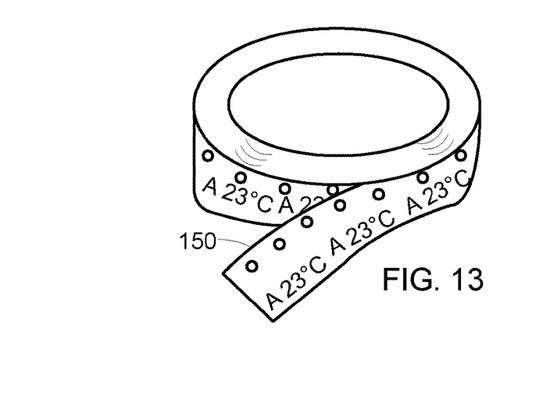
FIG. 13 illustrates a continuous strip of thermal-sensitive label with adhesive backing wound into a roll that behaves similar to and may be used as a type of electrician's tape.
Figure 14:
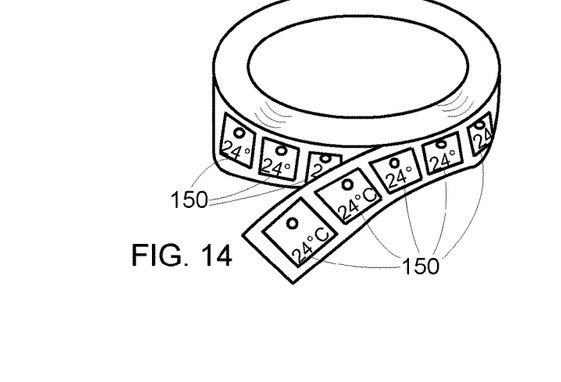
FIG. 14 illustrates a plurality of thermal-sensitive labels conveniently packaged for storage on a continuous strip wound into a roll.

FIGS. 13-14 show examples of how the labels 150 may be provided on rolls for easy dispensing. In FIG. 13, the roll of material is formed by a continuous length of the label 150 itself. A user may easily cut any desired size of the label material for affixing to a target device. The back of the label 150 may be a sticky adhesive and the whole label 150 of FIG. 13 may behave similar to and be used as a type of electrician's tape. In this way, every electrical joint and component that is taped with the label 150 of FIG. 13 will have one or more built-in thermal indicator(s) 152, 154 and allow for easy visual inspection of whether the joint or component has experienced an unexpected temperature rise past a predetermined threshold T1-Tn calculated based on the label's 150 set-point. In FIG. 14, the roll is simply a convenient package to store a plurality of labels 150. The roll itself may be a peel away backing 312 that is simply discarded when labels 150 are removed by a user.

A label kit may have a number of individual labels 150 such as those shown in FIGS. 2 and 7-12 provided. Bags or other containers may keep labels of particular types and/or set points together for easy selection by the user. Likewise, the kit may include any number of rolls of labels 150 such as illustrated in FIGS. 13-14. Different rolls may be provided for particular types and/or set points to allow easy selection by the user.

In some embodiments, thermal-sensitive colour-switching indicator devices are in the form of "stickers" exemplified by circular stickers or elongate strips. The backside of the devices is provided with an adhesive material for affixing to a component or surface for which heat monitoring is desired. The front side of the devices has a liquid crystal (LC) material applied to the adhesive strips, and a temperature sensor sandwiched between the LC material and the adhesive. The temperature sensor can be set with at least one or optionally more temperature set points that will trigger colour changes displayed by the LC material.

The LC material may be configured to display a green color across its entire surface (to indicate normal operating conditions). Any desired color scheme may be employed in a particular type 156 of label 150. If the temperature underlying the backside of the label devices rises above the temperature set point (by more than one or more pre-defined fixed amounts F1-Fn), the label's 150 LC thermal display indicator 152, 154 will change from green to red, indicating an alarm situation.

Alternatively, two temperature set points can be set to indicate: (i) a danger/risk condition (i.e., by changing the colour display from green to yellow), and (ii) an immediate equipment shut-down condition (i.e., by changing the colour display from yellow to red).

It is optional for the LC material to show a continuous colour change from green to yellow to red as the temperature on the backside of the devices increases from normal to warning to shutdown set points.

According to an exemplary embodiment disclosed is a three-layer over-heat warning device comprising: (i) a upper display layer comprising heat-sensitive colour-switching liquid crystal (LC) material, (ii) a middle layer comprising a temperature sensor, and (iii) a bottom layer comprising a strip of an adhesive material for releasable affixing to a piece of equipment The over-heat warning devices may be beneficially utilized as electrical safety and indicator labels 150 that change up to four colors using liquid crystal technology for the application of due-diligence, condition monitoring and life safety for indoor electrical systems and their components. Known liquid crystal technology that changes colors at different temperatures can be utilized in accordance with temperature control guidelines to meet NFPA, NETA and Denmark SPIE international testing maintenance specifications of temperature rise. The over-heat warning device can then return (or not) to the original color or ambient set point after the thermal anomaly has been removed or repaired. The labels 150 have ambient set points to accommodate the variable indoor temperatures of various spaces that contain electrical equipment and are of increments of 3 Deg C also to accommodate variable temperature within that space with a plus minus of 1 Deg C of accuracy. Certain versions of the labels 150 have been built, tested and approved by CSA for indoor use.

The electrical safety and indicator labels 150 may also use known liquid crystal technology or phase changer+substrate technology that does not change back to the original color for the purpose indicating a critical temperature rise has been reached, according to NFPA, NETA and Denmark SPIE international testing maintenance specifications.

In some embodiments, electrical safety and indicator labels 150 are beneficially utilized in the application of monitoring thermal anomalies of electrical distribution systems and their components of various voltages. Using known technology of liquid crystal thermochromic ink, electrical safety and indicator labels 150 change colors to indicate whether a thermal anomaly exists and indicate the severity of that anomaly. Using known technology of liquid crystal thermochromic ink, electrical safety and indicator labels 150 use up to four color changes for indication of the thermal anomaly severity. In some embodiments, included are (a) three temperature controlled color changes that return to the original and (b) one temperature controlled color change that does not change back to the original. One or more temperature controlled color changes indicate the severity of the thermal anomalies temperature rise from an ambient set point, and the set point is clearly marked on each electrical safety and indicator label 150. The one temperature controlled color change that does not change back to the original, is to indicate that a critical temperature rise has been reached from the ambient temperature set point that is marked on each electrical safety and indicator label 150.

The electrical safety and indicator labels 150 may be designed to meet NFPA 70 B, NETA and Denmark SPIE international laws and guide lines of temperature rise for various voltages of electrical distribution systems. Electrical safety and indicator labels 150 size and shape are designed to fit and affix to any and all indoor electrical components of electrical distribution systems.

These electrical safety and indicator labels 150 may employ two or more formulas representing different types of labels. A first formulated label type is intended use is for electrical components that have an air space between the affixed label and the thermal anomaly. For example, an affixed label 150 of the first type may be used on the door of an electrical cabinet containing electrical components inside the cabinet. A second formulated label 150 is intended use is for indoor electrical components where the label is in direct contact with the electrical component. For example, the second label type may be used on breakers or fuses, etc. The electrical safety and indicator labels 150 may be CSA tested and certified for custom defined temperature response. C22.2 No. 0.15 clause 5.4.2 Adhesion Test and clause 6.2 Exposure Condition for Indoor.

The electrical safety and indicator labels 150 may be custom designed in shape to fit any electrical components that include individual shapes, sizes and long running strips such as rolls of tape. Different types of labels 150 may be designed to meet national and international standards of various voltages. The invention is based on NFPA 70 B, NETA guide lines for temperature rise and Danish guidelines for low voltage. SPIE thermosence XVI; Vol2245 P11 1994.

An exemplary advantage of some embodiments of the invention is that the labels 150 allow inspectors and maintenance personal at a glance to recognize thermal anomalies that may exist within the electrical system as a part of their due-diligence, condition monitoring and fire safety programs.

According to some embodiments, a thermal-sensitive label includes a label-specific set point temperature visually displayed thereon, and a thermal indicator that changes visual appearance in dependence upon temperature change in comparison with a threshold temperature. The threshold temperature of the thermal indicator is set during manufacture to be a fixed amount above the set point temperature. The thermal indicator has a first visual appearance when a temperature measured by the thermal indicator is below the threshold temperature. The thermal indicator dynamically changes to a second visual appearance different than the visual appearance when a second temperature measured by the thermal indicator exceeds the threshold temperature. A label kit includes a plurality of labels with a variety of different set-points. Each of the labels may include one or both of a reversing thermal indicator for comparing current temperature to the threshold temperature and a non-reversing thermal indicator for comparing a maximum temperature to the threshold temperature.

Although the invention has been described in connection with preferred embodiments, it should be understood that various modifications, additions and alterations may be made to the invention by one skilled in the art without departing from the spirit and scope of the invention. For instance, since a long strip of label 150 may partially change color depending on temperature rises along only a portion of the label 150, long labels 150 can also be utilized to pinpoint a section or side of a device that is causing problems. A user may put larger label 150 on top of an item in order to know which parts of the item are above the set point temperatures. Waterproofing and/or insulation and coverings may also be utilized in conjunction with the labels for use outdoors. Other types of affixing techniques in addition or instead of adhesives may be utilized for affixing a labels 150 to target devices. For instance, the adhesive layer and peel away backing layers 310, 312 of FIG. 3 may be replaced with a magnetic layer in other embodiments to allow a label 150 to be affixed to metal without use of adhesive. This may be beneficial for high temperature components that may melt the adhesive.

In another example modification, other types of changes of visual appearances may be utilized to represent temperature rises of fixed amounts above a label's set point. Examples of visual appearances that may be employed in various embodiments include color changes, rolling colors effects where only a certain unit 700 of a temperature 702 bar are colored a certain color or otherwise emphasised depending on current or max temperature, grey scale, color intensity, hash and other patterns, etc. Any number of different F1-Fn fixed values with corresponding T1-Tn threshold temperatures and visual appearances may be employed on a particular label 150.

It is also not a limitation that all labels 150 must include both reversing and non-reversing thermal indicators 152, 154. In other embodiments, a single label 150 may include only one of these thermal indicators 152, 154 instead of both. When both the reversing and non-reversing thermal indicators 152, 154 are employed on a single label 150, it is also not a requirement that the fixed amounts F1-Fn and corresponding thresholds T1-Tn need to be the same for these two different types of thermal indicator sensors 152, 154. For instance, a single label 150 may have a reversing thermal indicator 152 that has four thresholds T1-T4 thereby allowing indication of five ranges of colors and corresponding seventies of anomalies (and normal operating condition) similar to as illustrated above in Table 3 and FIG. 5; however, the non-reversing thermal indicator 154 on that particular label 150 may only include a single threshold (e.g., T3) and will therefore only indicate when the max temperature has exceed that single threshold. The single threshold T3 of the non-reversing thermal indicator 154 may or may not match the third threshold T3 of the reversing thermal indicator 152 depending on different embodiments.

Other types of thermal indicators 152, 154 may be employed in other embodiments including all known types of thermochromic ink, liquid crystals, chemical phase changers, mechanical and fluid expansion thermometers, etc. Any adhesive, liquid crystal, phase changers, substrate and other portions of the label 150 may be confirmed heat proof up to a desired temperature level during manufacture and testing.

Functions of single modules, elements and other units as described above may be separated into multiple units, or the functions of multiple units may be combined into a single unit. All combinations and permutations of the above described features and embodiments may be utilized in conjunction with the invention.

What is claimed is:

1. A thermal-sensitive label comprising:
a set point temperature visually displayed on the label;
a thermal indicator that changes visual appearance in dependence upon temperature change in comparison with a first threshold temperature; and
an attachment layer allowing a user to selectively affix the label to a target device for monitoring temperature changes of the target device;
wherein the first threshold temperature of the thermal indicator is set during manufacture to be a fixed amount above the set point temperature;
the thermal indicator has a first visual appearance when a first temperature measured by the thermal indicator is below the first threshold temperature; and
the thermal indicator dynamically changes to a second visual appearance different than the first visual appearance when a second temperature measured by the thermal indicator exceeds the first threshold temperature.

2. The thermal-sensitive label of claim 1, wherein:
the thermal indicator includes a reversing thermal indicator that temporarily changes visual appearance in dependence upon temperature changes;
the reversing thermal indicator has a first visual appearance whenever a current temperature measured by the reversing thermal indicator is below the first threshold temperature; and
the reversing thermal indicator dynamically changes to a second visual appearance different than the first visual appearance in response to the current temperature measured by the reversing thermal indicator exceeding the first threshold temperature.

3. The thermal-sensitive label of claim 2, wherein:
the reversing thermal indicator has a plurality of threshold temperatures and a corresponding plurality of unique appearances; and
each time the current temperature of the reversing thermal indicator exceeds one of the threshold temperatures, the reversing thermal indicator dynamically changes appearance to a corresponding one of the unique appearances.

4. The thermal-sensitive label of claim 2, wherein the reversing thermal indicator comprises one or more reversing thermochromic liquid crystals.

5. The thermal-sensitive label of claim 2, wherein the first and second visual appearances of the reversing thermal indicator comprises different colors.

6. The thermal-sensitive label of claim 1, wherein:
the thermal indicator includes a non-reversing thermal indicator that permanently changes visual appearance in dependence upon temperature changes;
the non-reversing thermal indicator has a first visual appearance as long as a maximum temperature measured by the non-reversing thermal indicator has always been below the first threshold temperature; and
the non-reversing thermal indicator dynamically changes to a second visual appearance different than the first visual appearance of the non-reversing thermal indicator in response to a current temperature of the non-reversing thermal indicator exceeding the first threshold temperature.

7. The thermal-sensitive label of claim 6, wherein:
the non-reversing thermal indicator has a plurality of threshold temperatures and a corresponding plurality of unique appearances; and
each time the current temperature of the non-reversing thermal indicator exceeds one of the threshold temperatures, the non-reversing thermal indicator dynamically changes appearance to a corresponding one of its unique appearances.

8. The thermal-sensitive label of claim 7, wherein the plurality of threshold temperatures and corresponding plurality of unique appearances of the non-reversing thermal indicator match those of a reversing thermal indicator also included on the label.

9. The thermal-sensitive label of claim 6, wherein the non-reversing thermal indicator comprises one or more irreversible phase-change indicators that melt at a defined melting point and are absorbed by a substrate thereby causing permanent appearance change.

10. A label kit comprising:
a plurality of labels;
wherein each of the labels has a set point temperature visually displayed thereon;
at least some of the labels have different set point temperatures;
each of the labels includes a thermal indicator that changes visual appearance in dependence upon temperature change in comparison with a first threshold temperature;
the first threshold temperature of the thermal indicator within each particular one of the labels is set during manufacture to be a fixed amount above the set point temperature for the particular one of the labels;
the thermal indicator has a first visual appearance when a first temperature measured by the thermal indicator is below the first threshold temperature; and
the thermal indicator dynamically changes to a second visual appearance different than the first visual appearance when a second temperature measured by the thermal indicator exceeds the first threshold temperature.

11. The label kit of claim 10, wherein:
the thermal indicator of at least one of the labels includes a reversing thermal indicator that temporarily changes visual appearance in dependence upon temperature changes;
the reversing thermal indicator has a first visual appearance whenever a current temperature measured by the reversing thermal indicator is below the first threshold temperature; and
the reversing thermal indicator dynamically changes to a second visual appearance different than the first visual appearance in response to the current temperature measured by the reversing thermal indicator exceeding the first threshold temperature.

12. The label kit of claim 11, wherein:
the reversing thermal indicator has a plurality of threshold temperatures and a corresponding plurality of unique appearances; and
each time the current temperature of the reversing thermal indicator exceeds one of the threshold temperatures, the reversing thermal indicator dynamically changes appearance to a corresponding one of the unique appearances.

13. The label kit of claim 11, wherein the reversing thermal indicator comprises one or more reversing thermochromic liquid crystals.

14. The label kit of claim 10, wherein:
the thermal indicator of at least one of the labels includes a non-reversing thermal indicator that permanently changes visual appearance in dependence upon temperature changes;
the non-reversing thermal indicator has a first visual appearance as long as a maximum temperature measured by the non-reversing thermal indicator has always been below the first threshold temperature; and
the non-reversing thermal indicator dynamically changes to a second visual appearance different than the first visual appearance of the non-reversing thermal indicator in response to a current temperature of the non-reversing thermal indicator exceeding the first threshold temperature.

15. The label kit of claim 14, wherein:
the non-reversing thermal indicator has a plurality of threshold temperatures and a corresponding plurality of unique appearances; and
each time the current temperature of the non-reversing thermal indicator exceeds one of the threshold temperatures, the non-reversing thermal indicator dynamically changes appearance to a corresponding one of its unique appearances.

16. The label kit of claim 15, wherein the plurality of threshold temperatures and corresponding plurality of unique appearances of the non-reversing thermal indicator match those of a reversing thermal indicator also included on the at least one of the labels.

17. The label kit of claim 10, wherein the first threshold temperature of the thermal indicator within each of the labels that have different set point temperatures is above the set point temperature by the fixed amount that is a same fixed amount across the plurality of labels with different set point temperatures.

18. The label kit of claim 10, wherein:
at least some of the labels are an ambient type and have a first fixed amount by which the first threshold temperature of the thermal indicator within the labels of the ambient type is greater than the set point temperature;
at least some of the labels are a direct contact type and have a second fixed amount by which the first threshold temperature of the thermal indicator within the labels of the direct contact type is greater than the set point temperature; and
the first fixed amount for the ambient type is greater than the second fixed amount for the direct contact type.

19. A thermal-sensitive label comprising:
a set point temperature visually displayed on the label; and
a thermal indicator that changes visual appearance in dependence upon temperature change in comparison with a first threshold temperature;
wherein the first threshold temperature of the thermal indicator is set during manufacture to be a fixed amount above the set point temperature;
the thermal indicator has a first visual appearance when a first temperature measured by the thermal indicator is below the first threshold temperature;
the thermal indicator dynamically changes to a second visual appearance different than the first visual appearance when a second temperature measured by the thermal indicator exceeds the first threshold temperature;
the thermal indicator includes a non-reversing thermal indicator that permanently changes visual appearance in dependence upon temperature changes;
the non-reversing thermal indicator has a first visual appearance as long as a maximum temperature measured by the non-reversing thermal indicator has always been below the first threshold temperature; and
the non-reversing thermal indicator dynamically changes to a second visual appearance different than the first visual appearance of the non-reversing thermal indicator in response to a current temperature of the non-reversing thermal indicator exceeding the first threshold temperature.

20. The thermal-sensitive label of claim 19, wherein:
the thermal indicator includes a reversing thermal indicator that temporarily changes visual appearance in dependence upon temperature changes;
the reversing thermal indicator has a first visual appearance whenever a current temperature measured by the reversing thermal indicator is below the first threshold temperature; and
the reversing thermal indicator dynamically changes to a second visual appearance different than the first visual appearance in response to the current temperature measured by the reversing thermal indicator exceeding the first threshold temperature.

\* \* \* \* \*